Feb. 17, 1970 J. D. GREGORY 3,495,716

STEREO TAPE DISPLAY HOLDER

Filed May 16, 1968 2 Sheets-Sheet 1

INVENTOR
JERRY D. GREGORY

BY

Robert K. Rhea
AGENT

Feb. 17, 1970 J. D. GREGORY 3,495,716

STEREO TAPE DISPLAY HOLDER

Filed May 16, 1968 2 Sheets-Sheet 2

JERRY D. GREGORY
INVENTOR

BY

Robert K. Rhea
AGENT

United States Patent Office 3,495,716
Patented Feb. 17, 1970

3,495,716

STEREO TAPE DISPLAY HOLDER

Jerry D. Gregory, 8109 NW. 28,
Bethany, Okla. 73127

Filed May 16, 1968, Ser. No. 729,755
Int. Cl. E05b 73/00
U.S. Cl. 211—4 6 Claims

ABSTRACT OF THE DISCLOSURE

A substantially rectangular hollow housing having one open end, and an aperture in its opposite end and in its respective sides cooperatingly receives a stereo tape container. Lock means close the open end of the housing and swiveling linkage connects the housing to a display rack.

BACKGROUND OF THE INVENTION

The present invention relates to merchandise display and more particularly to a display holder for stereo tape containers.

It is conventional practice to display music, such as records and stereo tapes, so that customers may browse through the tapes or records and make their selections. However, because of the relatively small dimensions of individual containers for stereo tapes a problem is created by shop lifters. This problem has been solved to some extent by displaying the stereo tape containers within a locked glass cabinet. This has the disadvantage that the prospective customer cannot handle the tape container to read material printed on the exterior of the container setting forth the names of the songs or artists printed on opposing sides of the tape container.

Various containers have been employed for the storing of records, film and sound record tape reels to protect them from dust, damage from friction and to be readily available. A phonograph record holder is disclosed by the patent to E. A. Finn No. 2,922,527 and a tape reel storage by the patents to R. S. Ashberry No. 2,165,122, D. M. Wright No. 3,310,178 and W. V. Drobny No. 3,316,039 but none of these patents disclose a means for displaying records or stereo tape for a customer to browse through and make a purchase selection.

This invention, on the other hand, provides lockable holders for dsplaying individual stereo tape containers in high density fashion yet permitting the customer to handle the holder and read data pointed on the tape containers.

SUMMARY OF THE INVENTION

A substantially rectangular housing, having one opened end, removably receives at least one stereo tape container. The container is fastened in the housing by lock means and an aperture in its opposite end wall and an opening in each of its opposite sides expose data printed on the container. Swiveling linkage, connected with one wall of the housing, is in turn connected to a rod forming a part of a display rack so that the housings may be displayed in relatively close side by side relation with each individual housing being movable outwardly of the rack from between adjacent housings.

The principal object of this invention is to provide a lockable stereo tape containing housing pivotally connected to a display rack in high density relation with respect to other like housings so that any selected tape may be lifted out of juxtaposition with respect to adjacent housings for reading data printed on the stereo tape container and exposed through the openings in the housing.

DESCRIPTION OF THE PREFERRED EMBODIMENTS

Figures 1, 4:
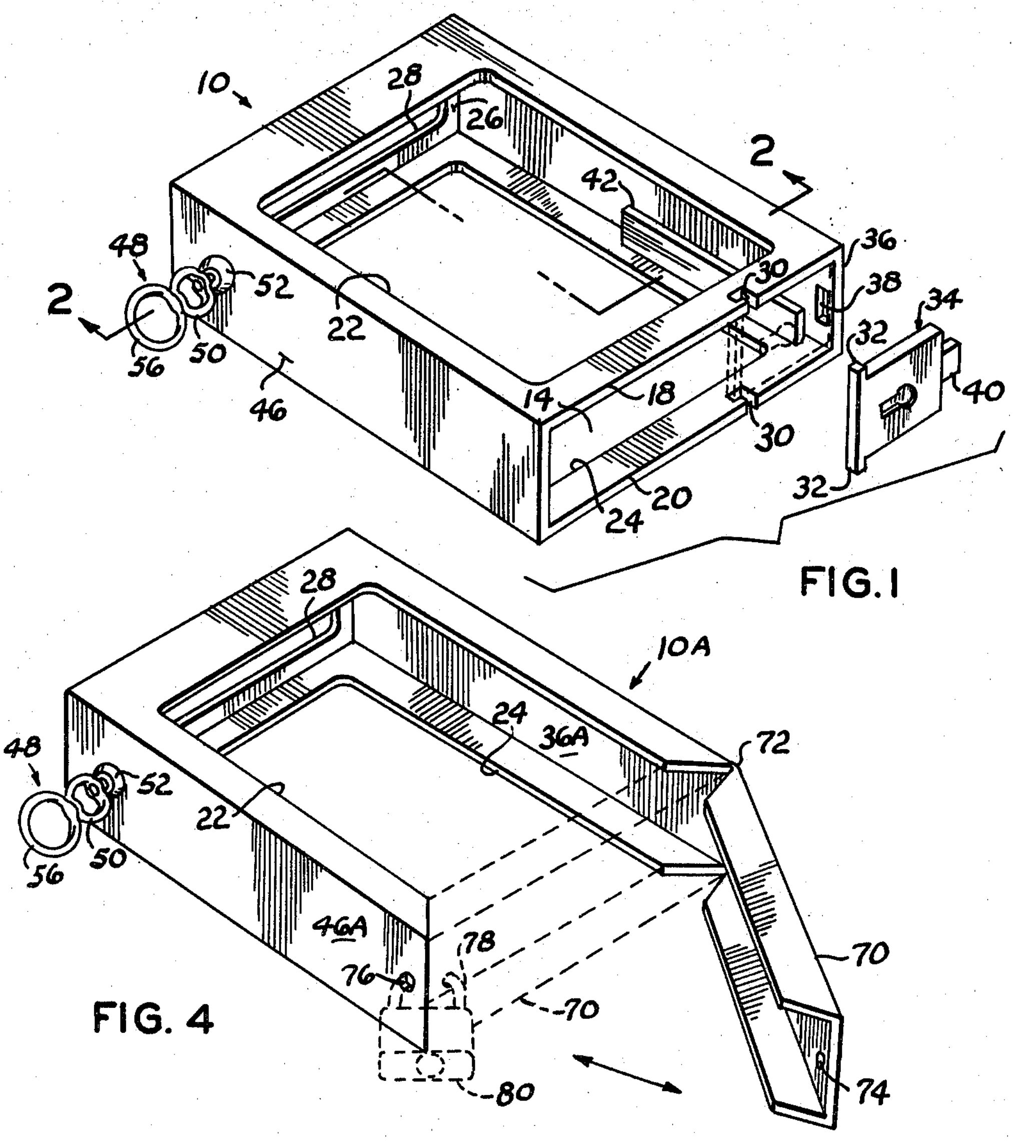
FIGURE 1 is an exploded perspective view of one embodiment of the housing and its locking means.
FIGURES 4 and 5 are perspective views of alternative embodiments of the housing illustrating alternative locking means.

Like characters of reference designate like parts in those figures of the drawings in which they occur.

Figure 2:
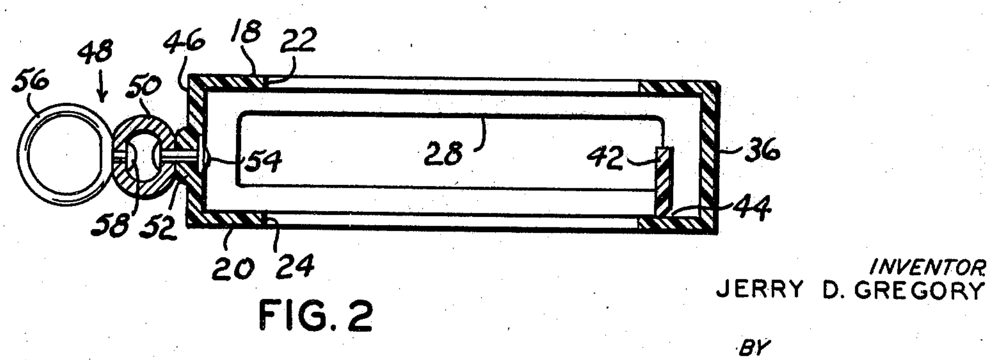
FIGURE 2 is a vertical cross-sectional view taken substantially along the line 2—2 of FIG. 1.
Figures 3, 5:
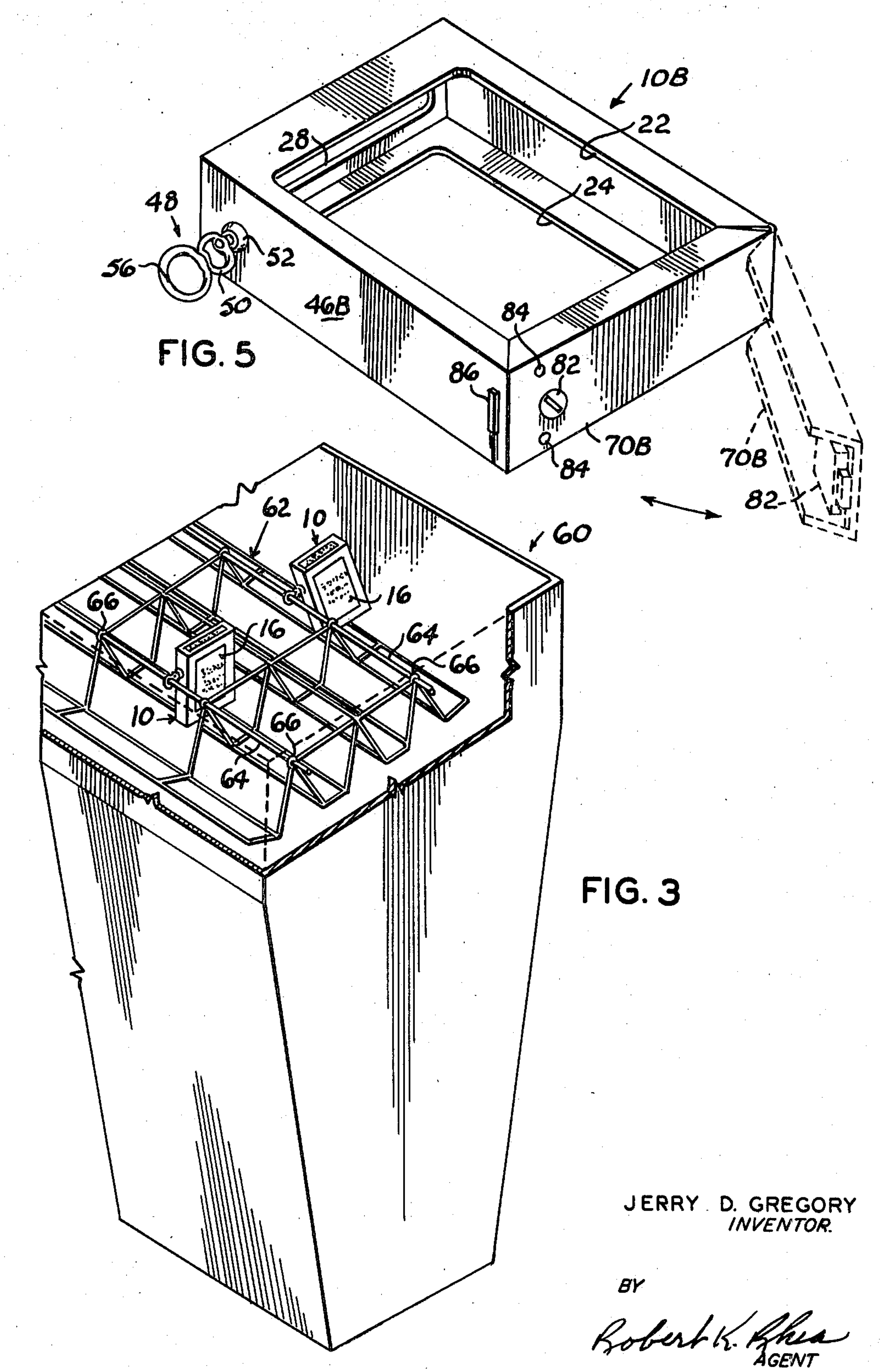
FIGURE 3 is a fragmentary perspective view of a display rack for the housings and its supporting cabinet, a portion of the cabinet being broken away for clarity.

In the drawings:

Referring more particularly to FIGS. 1 and 2, the reference numeral 10 indicates a rectangular box-like housing, preferably formed of plastic material, and having one open end 14. The inside dimensions of the housing is such that it will slidably receive and nest a stereo tape display container 16 (FIG. 3). Opposing side walls 18 and 20 of the housing are each provided with relatively large openings 22 and 24, respectively, for displaying data printed on opposing sides of the tape container 16. The housing end wall 26, opposite the open end 14, is similarly provided with an aperture 28 for exposing the name of the artist normally printed on an end wall of the tape container 16. Adjacent the housing open end 14, the free edge surface of each of the housing side walls 18 and 20 are provided with cooperating transversely aligned notches or slots 30 for receiving ears or lugs 32 projecting laterally of a modified conventional plate-like lock 34. The lock 34 is dimensioned so that it is closely received by the respective inner surfaces of the side walls 18 and 20 adjacent one housing edge wall 36. The housing edge wall 36 is provided with an aperture 38 which freely receives the key operated lock plunger 40 to lock the tape container 16 within the housing.

Since stereo tape containers are principally formed in three sizes, the housing 10, as mentioned hereinabove, accommodates the laregst size tape container. A relatively short upstanding partition wall 42 is formed within the housing adjacent the edge wall 36 and is joined to the inner surface of the housing side wall 20 between its opening 24 and the inner surface of the edge wall 36 so that the partition wall 42 permits the housing 10 to accommodate an intermediate size tape container. Longitudinally the wall 42 is preferably at least equal to one-half the longer dimension of the housing. When the partition wall 42 is not needed, it may be remeoved from the housing in breakaway fashion by means of a longitudinally extending notch 44 (FIG. 2) formed in the partition wall 42 at its juncture with the inner surface of the side wall 20. With the wall 42 removed the housing 10 will easily accommodate, in juxtaposed relation, two stereo tape containers commonly referred to as "cassettes."

The housing side wall 46 has substantially conventional swiveling link means 48 connected thereto at that end portion preferably adjacent the apertured end 26. The swiveling linkage 48 comprises an end link 50 which is coaxially connected with a boss 52, formed on the outer surface of the wall 46, by a bolt or rivet 54. A second or other end link 56 is connected in swiveling fashion to the end link 50 by a rivet 58.

Referring more particularly to FIG. 3, the numeral 60 indicates an upright open top rectangular display case having a display rack 62 formed of rod material and supported within the case 60 by longitudinally extending support rods 64. The support rods 64 preferably extend through opposing end walls of the case 60 so that they may be secured in place as by lock nuts, not shown. The rack 62 is substantially conventional being dimensioned for holding a plurality of the housings 10 in juxtaposed relation and provided with loops 66 which slidably receive the rod 64 during assembly. The swivel link 56 and the support rods 64 are dimensioned so that the rod is freely received by the link 56 to prevent separation of the housing 10 from the display rack. The purpose of the swiveling linkage is to permit an individual housing to be lifted upwardly in pivoting relation with respect to its supporting rod 64 and further permitting the housing to be rotated in either direction about the axis of the rivets 54 and 58.

Referring now more particularly to FIG. 4, the numeral 10A indicates an alternative embodiment of the housing which is substantially identical in general configuration with respect to the housing 10 but is formed with a channel-shaped end wall 70 in lieu of the open end of the housing 10. The end wall 70 is integrally connected at one end to the housing edge wall 36A to form a hinge 72 for pivoting movement, of its free end portion, toward and away from its opposite edge wall 46A for opening and closing the housing 10A. The end wall 70, opposite its hinge 72, is provided with an aperture 74 cooperatively aligned with an aperture 76 formed in the adjacent end portion of the edge wall 46A for receiving the U-shaped bolt 78 of a key operated lock 80. The housing 10A is similarly provided with the aperture 28 in its end wall opposite the hinged wall 70 and openings 22 and 24 in its respective opposing side walls. One of the swiveling link means 48 is similarly connected to the edge wall 46A.

A further modification of the housing 10A is shown at 10B (FIG. 5) wherein the hingedly connected end wall 70B is provided with a conventional key operated lock 82 which is secured to the inner surface of the end wall 70B opposite its hinge by rivets 84. The housing edge wall 46B is provided with an aperture for receiving the key operated plunger 86 of the lock 82. The housing 10B is similarly provided with the aperture 28 in its end wall opposite the hinged wall 70B and openings 22 and 24 in its respective opposing side walls. One of the swiveling link means 48 is similarly connected to the edge wall 46B.

The housings 10, 10A or 10B, when connected with the display rack support rods 64 and containing stereo tape containers 16, are normally left connected to the display rack. Selections made by customers are sold from a supply which may be kept behind locked doors in the depending portion of the cabinet 60.

Obviously the invention is susceptible to some change or alteration without defeating its practicability, and I therefore do not wish to be confined to the preferred embodiment shown in the drawings and described herein.

I claim:

1. A tape container display apparatus, comprising: a relatively thin rectangular tape container receiving housing having an end wall, opposing edge walls, opposing side walls and an open end opposite its end wall and having an elongated aperture in its end wall opposite its open end said housing having relatively large openings in its opposing side walls for exposing data printed on opposite sides of said tape container; and means for lockably closing said open end.

2. Structure as specified in claim 1 wherein said locking means comprises transversely aligned slots in said side walls projecting inwardly from their edge surface defining the open end and in which one said edge wall is provided with an aperture in its end portion adjacent said open end; and a key operated lock disposed within the open end of said housing and having laterally extending lugs releasably received by said slots, said lock having a plunger slidably received by the aperture in said edge wall.

3. Structure as specified in claim 1 wherein said locking means comprises: an aperture in an end portion of one said edge wall adjacent the open end of said housing, an end wall hingedly connected at one end to the other said edge wall at its end portion adjacent the open end of said housing, said end wall having an aperture in its end portion opposite its hingedly connected end; and a key operated lock having a bolt means loosely received in at least one of said apertures.

4. Structure as specified in claim 3 in which a portion said lock is secured to the inner surface of said end wall opposite its hingedly connected end and said bolt means comprises a plunger slidably received by the aperture in said edge wall.

5. Structure as specified in claim 2 in which said display apparatus further includes a wire rack for supporting a plurality of said housings in juxtaposed relation, said wire rack having a horizontal support rod; and swivel means connected at one end with one said edge wall and surrounding said rod at its other end.

6. Structure as specified in claim 4 in which said display apparatus further includes a wire rack for supporting a plurality of said housings in juxtaposed relation, said wire rack having a horizontal support rod; and swivel means connected at one end with one said edge wall and surrounding said rod at its other end.

References Cited

UNITED STATES PATENTS

| | | | |
|---|---|---|---|
| 2,922,527 | 1/1960 | Finn | 211—40 |
| 2,926,788 | 3/1960 | Jacobson | 211—4 |
| 3,316,039 | 4/1967 | Drobny | 312—13 X |
| 3,348,668 | 10/1967 | Amatsu | 312—20 X |
| 3,389,942 | 6/1968 | Jacob | 312—20 |

FOREIGN PATENTS 1,137,954 10/1962 Germany.

DAVID H. BROWN, Primary Examiner

U.S. Cl. X.R.

211—40